(12) United States Patent
Li et al.

(10) Patent No.: US 11,440,170 B2
(45) Date of Patent: Sep. 13, 2022

(54) APPARATUSES AND METHODS FOR SEPARATING, FEEDING AND MOUNTING O-RINGS

(71) Applicant: ABB Schweiz AG, Baden (CH)

(72) Inventors: Cheng Li, Shanghai (CN); Feifei Zhao, Xi'an (CN); Yichao Mao, Hangzhou (CN)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 16/991,541

(22) Filed: Aug. 12, 2020

(65) Prior Publication Data
US 2020/0368886 A1 Nov. 26, 2020

Related U.S. Application Data

(63) Continuation of application No. PCT/CN2018/076680, filed on Feb. 13, 2018.

(51) Int. Cl.
B23P 19/08 (2006.01)
B25J 15/00 (2006.01)
(Continued)

(52) U.S. Cl.
CPC ........ B25B 27/0028 (2013.01); B23P 19/084 (2013.01); B25J 15/0019 (2013.01);
(Continued)

(58) Field of Classification Search
CPC ......... Y10T 29/49872; Y10T 29/53657; B23P 19/105; B23P 19/084; B25J 11/00;
(Continued)

(56) References Cited

U.S. PATENT DOCUMENTS 3,694,894 A 10/1972 Jelinek et al.
6,956,347 B2 * 10/2005 Nihei ................... B25J 19/02
318/568.16
2015/0224613 A1 8/2015 Iwashita

FOREIGN PATENT DOCUMENTS

CN 206925779 U 1/2018
EP 2874218 A1 5/2015
(Continued)

OTHER PUBLICATIONS

Second Office Action, issued by the China National Intellectual Property Administration (CNIPA), regarding corresponding patent application Serial No. CN201880088420.6; dated Aug. 18, 2021; 13 pages (w/ English Translation).

(Continued)

Primary Examiner — Jermie E Cozart
(74) Attorney, Agent, or Firm — Greenberg Traurig, LLP

(57) ABSTRACT

The present application discloses an apparatus for mounting an O-ring to a work piece, which includes a body including a plurality of connecting holes for connecting a pressure source to the body; an annular groove formed on the body and adapted to receive the O-ring; and a plurality of air channels formed in the body, the plurality of air channels being in fluid communication with the annular groove and the plurality of connecting holes to provide negative pressure with the pressure source in the annular groove to suck the O-ring in the annular groove, the annular groove is coaxial with a groove formed on a surface of the work piece during the mounting so that the O-ring is dropped into the groove when the pressure source is disconnected from the body or provides positive pressure to the plurality of air channels.

20 Claims, 15 Drawing Sheets

(51) Int. Cl.
*B25B 27/00* (2006.01)
*B25J 13/08* (2006.01)
*B23P 19/10* (2006.01)
*B25J 11/00* (2006.01)
*B25J 15/06* (2006.01)

(52) U.S. Cl.
CPC .............. *B23P 19/105* (2013.01); *B25J 11/00* (2013.01); *B25J 13/086* (2013.01); *B25J 15/0023* (2013.01); *B25J 15/0616* (2013.01); *B25J 15/0658* (2013.01); *B25J 15/0683* (2013.01); *Y10T 29/49872* (2015.01); *Y10T 29/53657* (2015.01)

(58) Field of Classification Search
CPC .. B25J 13/086; B25J 15/0683; B25J 15/0658; B25J 15/0616; B25J 15/0023; B25J 15/0019
See application file for complete search history.

(56) References Cited

FOREIGN PATENT DOCUMENTS

| | | |
|---|---|---|
| JP | H10146726 A | 6/1998 |
| JP | 2012024892 A | 2/2012 |
| WO | 9206816 A1 | 4/1992 |

OTHER PUBLICATIONS

Extended European Search Report, issued by the European Patent Office, regarding corresponding patent application Serial No. EP18906518.8; dated Aug. 20, 2021; 8 pages.
First Office Action, issued by the State Intellectual Property Office of P.R. of China, regarding corresponding patent application Serial No. CN 201880088420.6; dated Apr. 27, 2021, 7 pages (translated).
Intellectual Property Office of the P.R. China, International Search Report & Written Opinion issued in corresponding Application No. PCT/CN2018/076680, dated Nov. 1, 2018, 11 pp.

* cited by examiner

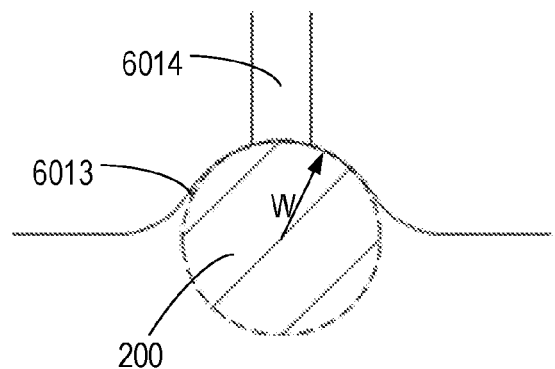
FIG. 15
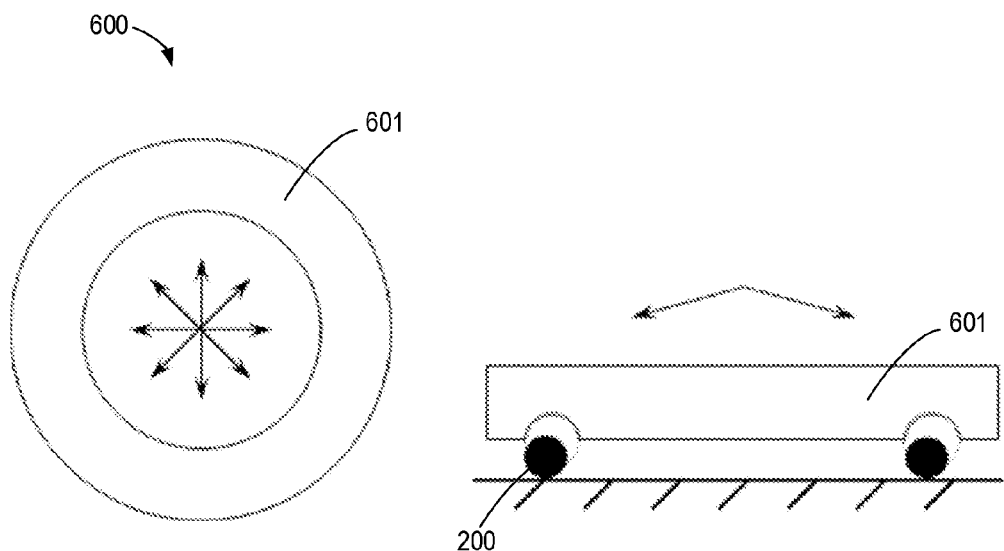
FIG. 16A
FIG. 16B

APPARATUSES AND METHODS FOR SEPARATING, FEEDING AND MOUNTING O-RINGS

FIELD

Embodiments of the present disclosure generally relate to apparatus for operating O-rings, and more specifically, to apparatuses and methods for separating, feeding and mounting O-rings.

BACKGROUND

An O-ring, also known as a packing or a tone joint, is a mechanical gasket in the shape of a torus. It is a loop of elastomer with a round cross-section, designed to be seated in a groove and compressed during assembly between two or more parts, creating a seal at the interface. The O-ring may be used in static applications or in dynamic applications where there is relative motion between the parts and the O-ring. O-rings are one of the most common seals used in machine design because they are inexpensive, easy to make, reliable.

Under normal conditions, O-rings are assembled manually, which is inefficient and labor-intensive and significantly reduces the overall assembly efficiency of a work piece. In order to increase efficiency, the demand for automated assembly of O-rings is increasing. The automated assembly of O-rings involves feeding and mounting of O-rings. Typically, a mechanism for feeding the O-rings utilizes vibration to sort and separate the O-rings, which is more applicable for the O-rings having a small ratio of an inner diameter I to a wire diameter W (refers to as "rigid O-rings"). Such rigid O-rings are generally not easily deformed and difficult to tangle together, and thus they can be separated using vibration. However, vibration does not work for the O-rings having a large ratio of the inner diameter I to the wire diameter W (refers to as "flexible O-rings"), which are more widely used in the industry, because they are easily deformed and entangled.

Furthermore, traditional O-ring auto-assembly methods are usually merely suitable for the O-ring mounting on an outer circumference of a shaft or an inner circumference of a hole. However, such methods cannot be applied to mounting the O-ring, particularly the flexible O-ring, in a groove on an end surface of a work piece, which is also widely used in the industry. For example, almost all the O-rings in the joints of a manipulator robot are mounted in the groove on the end surface.

SUMMARY

Embodiments of the present disclosure provide a solution for providing an apparatus for mounting an O-ring to a work piece by sucking the O-ring.

In a first aspect, an apparatus for mounting an O-ring to a work piece is provided. The apparatus comprises a body comprising a plurality of connecting holes for connecting a pressure source to the body; an annular groove formed on the body and adapted to receive the O-ring; and a plurality of air channels formed in the body, the plurality of air channels being in fluid communication with the annular groove and the plurality of connecting holes to provide negative pressure with the pressure source in the annular groove to suck the O-ring in the annular groove, wherein the annular groove is coaxial with a groove formed on an surface of the work piece during the mounting so that the O-ring is dropped into the groove when the pressure source is disconnected from the body or provides positive pressure to the plurality of air channels.

In some embodiments, a radial cross-section of the annular groove is of an arc shape, a radius of the arc being substantially same as a wire diameter of the O-ring.

In some embodiments, at least one edge of the annular groove has chamfers.

In some embodiments, the body comprises a first portion, a second portion and at least one sealing component arranged between the first portion and the second portion, and wherein the annular groove and the plurality of air channels are formed in the second portion, and the plurality of connecting holes are formed in the first portion.

In some embodiments, the apparatus further comprises a vacuum chamber formed on the first portion for connecting the plurality of air channels and the plurality of connecting holes.

In some embodiments, the vacuum chamber is ring-shaped and coaxial with the annular groove.

In some embodiments, the plurality of air channels are arranged evenly and circumferentially between the annular groove and the vacuum chamber.

In some embodiments, the apparatus further comprises at least one mounting portion arranged on the body and adapted to couple the body to a robot.

In some embodiments, the apparatus further comprises a positing sensor mounted on the body and adapted to detect a position of the O-ring or the groove.

In second aspect, a robot is provided. The robot is operable to use the apparatus as mentioned above to mount an O-ring to a work piece.

In third aspect, a method for mounting an O-ring to a work piece is provided. The method comprises providing negative pressure in an annular groove formed on a body with a pressure source to suck the O-ring in the annular groove, wherein a plurality of connecting holes are formed on the body for connecting the pressure source to the body, and wherein a plurality of air channels are in fluid communication with the annular groove and the plurality of connecting holes; moving the body over the work piece, wherein the annular groove is coaxial with a groove formed on an surface of the work piece; and dropping the O-ring into the groove by disconnecting the pressure source from the body or providing positive pressure to the plurality of air channels using the pressure source.

In some embodiments, the method further comprises moving the body, before moving the body over the work piece, back and forth in multiple directions while moving the body towards and away from the O-ring to ensure the O-ring to be sucked in the annular groove.

In some embodiments, the method further comprises moving the body, after dropping the O-ring into the groove, back and forth in multiple directions while moving the body towards and away from the O-ring to ensure the O-ring to be in the groove.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

FIG. 15 shows a partially enlarged view of the radial cross-section of the annular groove of the apparatus for separating and feeding O-rings according to some other embodiments of the present disclosure;

FIGS. 16A and 16B show a schematic diagram of a process of the apparatus for ensuring the O-ring to be sucked in the annual groove according to some other embodiments of the present disclosure;

Throughout the drawings, the same or similar reference symbols are used to indicate the same or similar elements.

DETAILED DESCRIPTION

The present disclosure will now be discussed with reference to several example embodiments. It is to be understood that these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Figure 1:
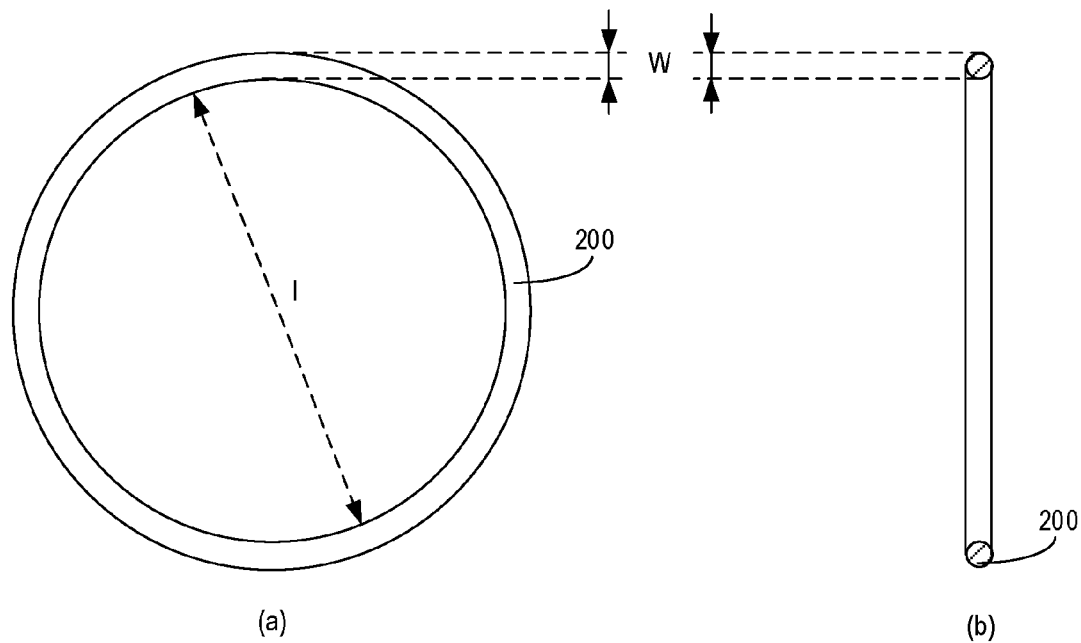
FIG. 1 shows a front view and a side view of an O-ring.

There are many sizes of O-rings used in the industry. FIG. 1 shows a front view and a side view of an O-ring 200. As shown, the O-ring 200 with certain elasticity has a wire diameter W and an inner diameter I. Generally, a ratio of the inner diameter I to the wire diameter W may reflect the deformation ability of the O-ring 200 to a certain extent. Specifically, the smaller the ratio, the harder deformed (refers to as "rigid O-ring") and the larger the ratio, the more easily deformed (refers to as "flexible O-ring").

Flexible O-rings are widely used in the industry for a variety of purposes. However, the flexible O-rings are usually easy to be deformed and entangled, and as a result, they cannot be easily separated and fed with the conventional vibration apparatus and method. Thus, in many cases, the flexible O-rings need to be separated or fed manually. Manual operation is inefficient and labor-intensive which significantly reduces the overall assembly efficiency of a work piece. Furthermore, manual separation and feeding of the O-rings are also prone to mal-operations and various assembly problems.

In order to improve efficiency and accuracy, embodiments of the present disclosure provide an apparatus 100 for separating and feeding O-rings 200. Now some example embodiments will be described with reference to FIGS. 2-5.

Figure 2:
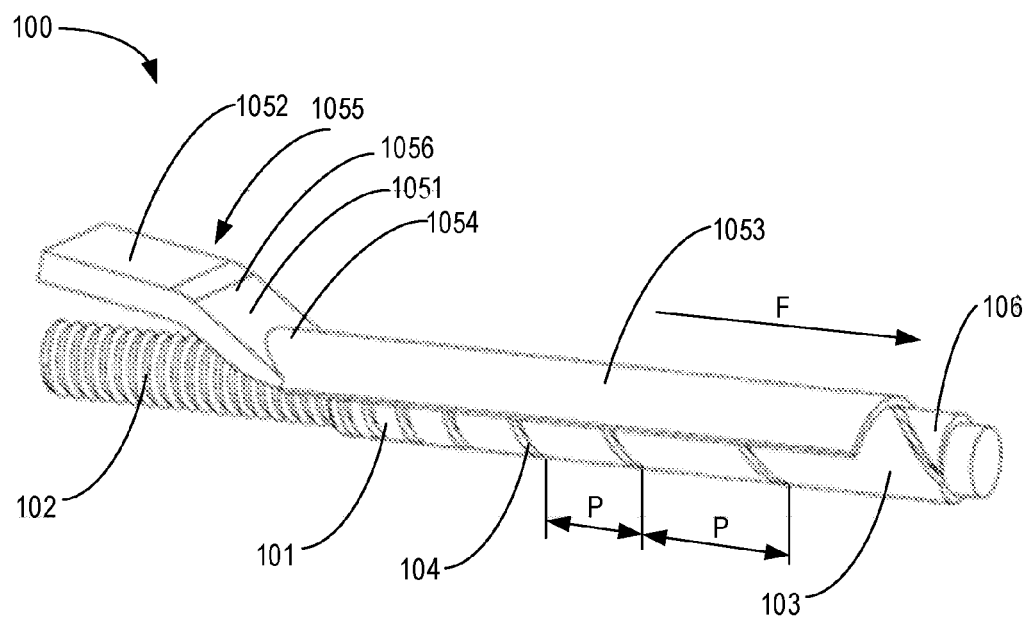
FIG. 2 shows a perspective view of the apparatus for separating and feeding O-rings according to embodiments of the present disclosure.
Figure 3:
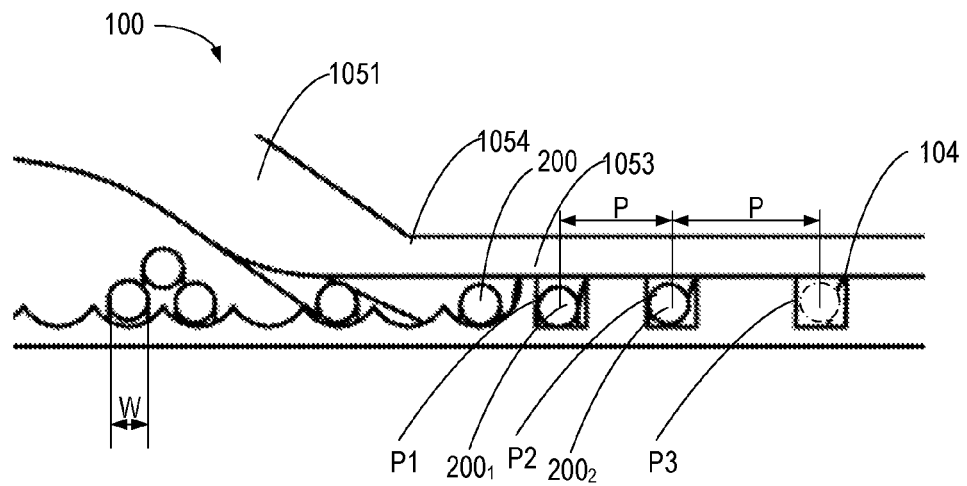
FIG. 3 shows a partially enlarged sectional view of the apparatus for separating and feeding O-rings according to embodiments of the present disclosure.
Figure 3:
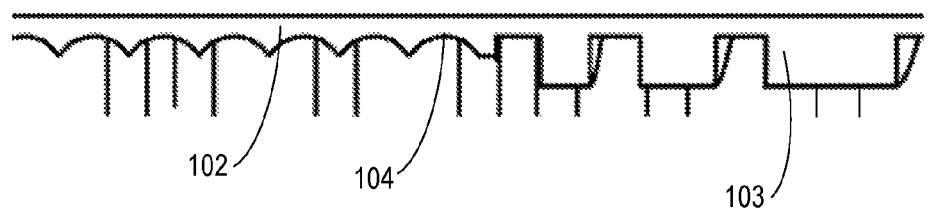
Figure 4:
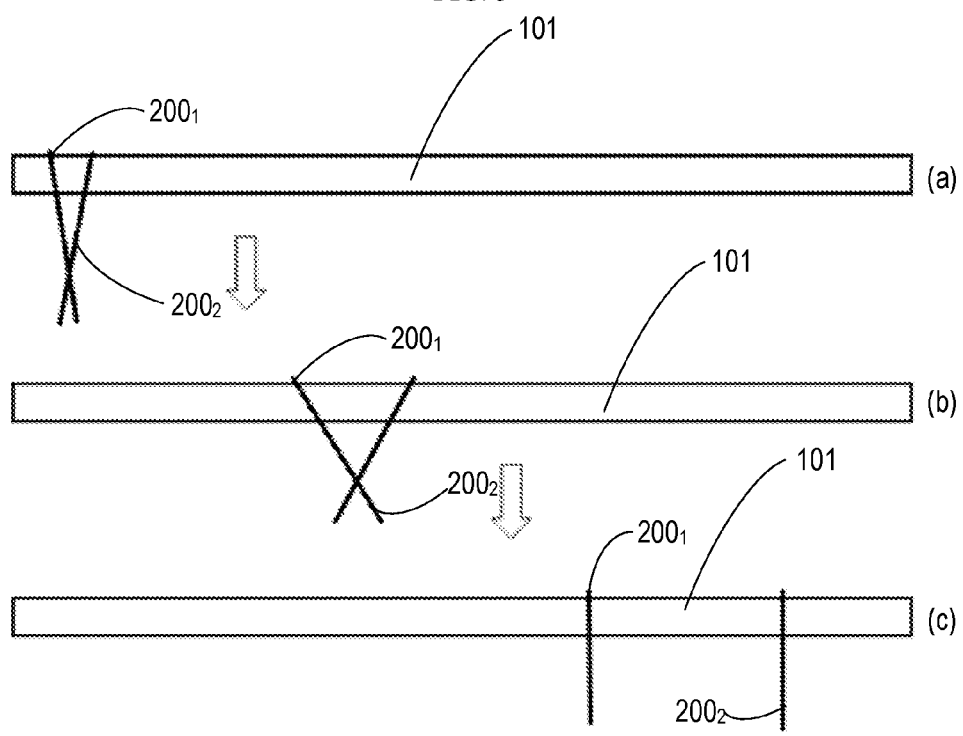
FIG. 4 shows a schematic diagram of a feeding process of the apparatus for separating and feeding O-rings according to embodiments of the present disclosure.
Figure 5:
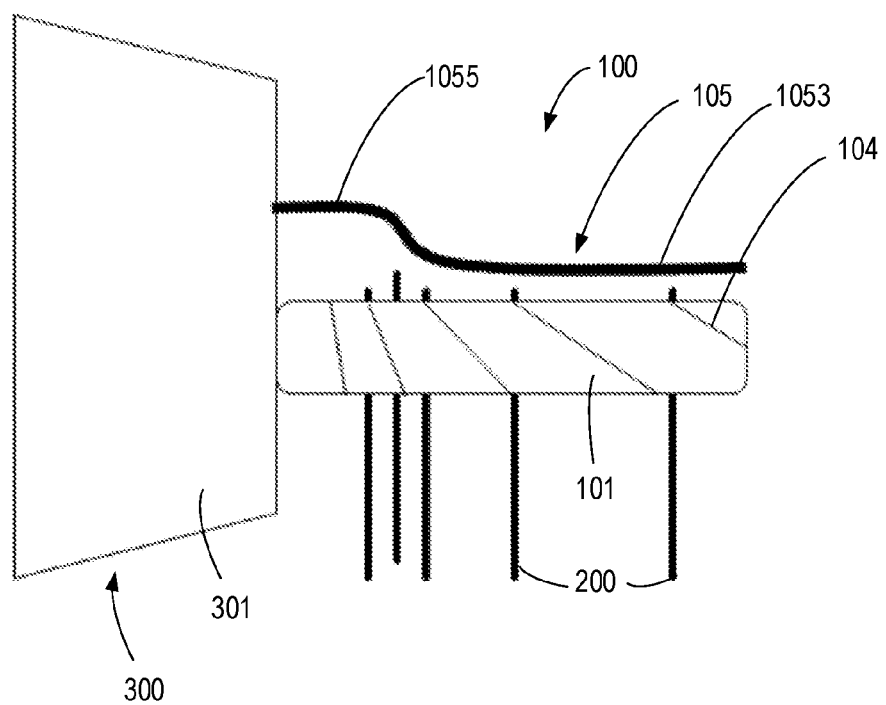
FIG. 5 shows a schematic diagram of the apparatus for separating and feeding O-rings which is coupled to a robot according to embodiments of the present disclosure.

FIG. 2 shows a perspective view of the apparatus 100 for separating and feeding O-rings 200 according to embodiments of the present disclosure; FIG. 3 shows a partially enlarged view of the apparatus for separating and feeding O-rings 200; FIG. 4 shows a schematic diagram of a feeding process of the apparatus 100; and FIG. 5 shows a schematic diagram of the apparatus 100 coupled to a robot according to embodiments of the present disclosure.

Generally, as shown in FIGS. 2 and 3, the apparatus 100 comprises a rotatable body 101 and a helix groove 104 formed thereon. In some embodiments, the rotatable body 101 may be hollow or solid. In some other embodiments, the rotatable body 101 may be integrally formed or assembled. For example, the rotatable body 101 may be injection molded or formed by coating a metal rod with a layer of plastic. It is to be understood that the above embodiment of forming the rotatable body 101 is merely for illustration, without suggesting any limitations as to the scope of the present disclosure. Any other suitable methods and/or arrangements are possible as well. For example, the rotatable body 101 and the helix groove 104 may be made by molding.

The rotatable body 101 comprises two portions, a storage portion 102 and a separating portion 103. These portions are arranged in the feeding direction F, as shown in FIG. 2. Specifically, the storage portion 102 is used for storing a plurality of O-rings 200 to be separated and fed. That is, the O-rings 200 may be hanged on the rotatable body 101, as shown in FIGS. 3 and 4.

According to embodiments of the present disclosure, a helix groove 104 is formed on the rotatable body 101 across the storage portion 102 and the separating portion 103. A width and a depth of the helix groove 104 are adapted to the wire diameter W of the O-ring 200, so that only one O-ring can be hanged on a same position of the helix groove 104. In addition, the helix groove 104 is formed in such a way that the pitch P thereof on the separating portion 103 increases along the feeding direction F, as shown in FIG. 2.

In operation, the rotatable body 101 may be driven to rotate, for example, by a robot 300, a motor (not shown) or the like. Rotation of the body 101 causes relative movement between the O-ring 200 and the helix groove 104. As a result, as the rotatable body 101 turns one circle, the O-ring 200 in the helix groove 104 can be conveyed in the feeding direction F by one pitch. In this way, the plurality of O-rings 200 hanged on the storage portion 102 are conveyed in the helix groove 104 forwardly with the rotation of the rotatable body 101, as shown in FIG. 4.

Due to the increased pitch P of the helix groove 104 on the separating portion 103, as the rotatable body 101 turns one cycle, the O-rings 200 in the different positions of the helix groove 104 on the separating portion 103 may be conveyed by different distances. Only by way of example, as shown in FIGS. 3 and 4, at the beginning, a first O-ring $200_1$ is located in a first position P1 and a second O-ring $200_2$ is located in a second position P2. As shown, a distance between the first position P1 and the second position P2 is one pitch. With the rotatable body 101 turning one circle, the first O-ring $200_1$ is conveyed to the second position P2 and the second O-ring $200_2$ is conveyed to a third position P3, as shown in FIGS. 3 and 4. As described above, the pitch P increases along the feeding direction F, which means that the distance between the first position P1 and the second position P2 is different from the distance between the second position P2 and the third position P3. As a result, the conveyed distance of the first O-ring $200_1$ is shorter than the one of the second O-ring $200_2$. In this way, with the rotation of the rotatable body 101, the distance between the first O-ring $200_1$ and the second O-ring $200_2$ increase gradually, during which process the first O-ring $200_1$ and the second O-ring $200_2$ are separated, as shown in FIG. 4. Eventually, the separated O-rings 200 can be conveyed to a predetermined position. In some embodiments, the predetermined position may be a position adjacent to the work piece 400. The work piece 400 may comprise a groove 402 for receiving the O-ring on an end surface 401, which will be discussed with reference to FIG. 6 below. It is to be understood that the predetermined position may be any position that facilitates the mounting of the O-ring 200 to the work piece 402.

By use of the apparatus 100 as described herein, no matter how flexible the O-rings 200 are, the O-rings 200 may be separated and fed to the predetermined position in an efficient and automated way. In this way, the automated separation and feeding of the O-rings 200, particularly the flexible O-rings, may be achieved. Furthermore, in some embodiments, the rotatable body 101 may be engaged with an operating mechanism 301 of the robot 300 to thereby be coupled to the robot 300, as shown in FIG. 5, which will be discussed in detail below. Thus, the rotatable body 101 may be controlled to rotate by the robot 300 and thus efficiency and accuracy are guaranteed.

It can be seen that with the apparatus 100, the automated separation and feeding of the O-rings 200 can be achieved by conveying each of the O-rings 200 in the different positions of the helix groove 104. In case that there are large numbers of O-rings 200 in the storage portion 102, the O-rings 200 may overlap in the same position of the helix groove 104, which causes the O-rings 200 to be conveyed out of the helix groove 104. In some embodiments, in order to prevent the plurality of O-rings 200 from being out of the helix groove 104 and/or to prevent more than one O-ring 200 from overlapping in the same position of the helix groove 104 in the separating portion 103 during the conveying, a limiting mechanism 1053 may be provided, as shown in FIG. 2.

As shown, the limiting mechanism 1053 may be arranged over the separating portion 103 to block the overlapping O-rings 200, so that the overlapping O-rings 200 can be conveyed to the separating portion 103 only after they are located in the helix groove 104, as shown in FIG. 3. In this way, it can be ensured with the limiting mechanism 1053 that each of the O-rings 200 is conveyed separately in the helix groove 104 in the separating portion 103.

In some embodiments, a distance between the limiting mechanism 1053 and the rotatable body 101 may be set to be smaller than the wire diameter W of the O-ring 200. As a result, the overlapping O-rings 200 may be blocked because they cannot pass through a space between the limiting mechanism 1053 and the rotatable body 101. Alternatively, in other embodiments, the limiting mechanism 1053 may contact the outer circumference of the rotatable body 101. That is, the distance between the limiting mechanism 1053 and the rotatable body 101 may be substantially zero, as shown in FIG. 3, which facilitates the attachment of the limiting mechanism 1053 to the rotatable body 101.

The limiting mechanism 1053 may be attached to the rotatable body 101 in a variety of ways. In some embodiments, for example, the limiting mechanism 1053 and the rotatable body 101 may be attached with each other by magnetic attraction. For example, at least a part of the rotatable body 101 may be made of magnetic absorbent material, such as iron, and at least a part of the limiting mechanism 1053 may be made of a magnet. In this way, the limiting mechanism 1053 may be attached to the rotatable body 101 by being absorbed with each other. It is to be understood that the above embodiments of attaching the limiting portion 1053 to the rotatable body 101 are merely for illustration, without suggesting any limitations as to the scope of the present disclosure. Any other suitable structures and/or arrangements are possible as well. For example, in some embodiments, the limiting mechanism 1053 may be attached to the rotatable body 101 via a pivoting mechanism. The pivoting mechanism may be operable to cause the limiting mechanism 1053 and the rotatable body 101 to pivot relative to each other.

As described above, in some embodiments, the body 101 may be driven by a robot 300 as shown in FIG. 5. To this end, the rotatable body 101 may be engaged with an operating mechanism 301. In some embodiments, the limiting mechanism 1053 and the rotatable body 101 may be coupled to different engaging structures of the operating mechanism 301, as shown in FIG. 5. In this way, the robot 300 may control the limiting mechanism 1053 and the rotatable body 101 to move relative to each other.

In some embodiments, the limiting mechanism 1053 and the rotatable body 101 may be controlled by the robot 300 to move towards or away from each other. In some other embodiments, the limiting mechanism 1053 and the rotatable body 101 may be controlled to pivot relative to each other. With such movement of the limiting mechanism 1053 and the rotatable body 101 relative to each other, the plurality of O-rings 200 may be picked or clamped from a stack of the O-rings 200 onto the storage portion 102 of the rotatable body 101. For example, the rotatable body 101 may be controlled to move away from the limiting mechanism 1053 and then inserted in the stack of the O-rings 200. Then the robot 300 controls the limiting mechanism 1053 and the rotatable body 101 to move towards each other, thereby picking or clamping the plurality of O-rings 200 on the rotatable body 101. The plurality of O-rings 200 on the rotatable body 101 may be hanged onto the storage portion 102 in a variety of ways. For example, the robot 300 may control the rotatable body 101 to rotate so that the storage portion 102 is located at a lower part of the rotatable body 101. As a result, the plurality of O-rings 200 may slide to the storage portion 102 under gravity.

It is to be understood that the above embodiment of picking the O-rings 200 into the storage portion 102 is merely for illustration, without suggesting any limitations as to the scope of the present disclosure. Any other suitable structures and/or arrangements are possible as well. For example, in some embodiments, the plurality of O-rings 200 may be arranged to the storage portion 102 by another robot or manually.

In some embodiments, the apparatus 100 may further comprise a holding mechanism 1055, with which the limiting mechanism 1053 may be coupled to the robot 300. The holding mechanism 1055 may comprise a guiding section 1051 and a holding section 1052, as shown in FIG. 2. The guiding section 1051 may be extended from an end 1054 of the limiting mechanism 1053 adjacent to the storage portion 102 and away from the rotatable body 101 in a direction opposite to the feeding direction F. For example, in some embodiments, the guiding section 1051 may be inclined from the end 1054 of the limiting mechanism 1053, as shown in FIG. 2. Alternatively, in some embodiments, the guiding section 1051 may be extended from and perpendicular to the limiting mechanism 1053.

The holding section 1052 may extend from an end 1056 of the guiding section 1051 away from the separating portion 103 and may be engaged with the operating mechanism 301 of the robot 300. In this way, the limiting mechanism 1053 may be coupled to the robot 300.

Furthermore, as shown in FIG. 2, the guiding section 1051 and the holding section 1052 are arranged over the storage portion 102 away from the rotatable body 101 by a certain distance. Because the space between the holding section 1052 and the storage portion 102 may be used for accommodating O-rings 200, the larger the distance therebetween, more O-rings 200 may be hanged on the storage portion 102. The distance between the holding section 1052 and the rotatable body 101 may be substantially the same as a distance of the engaging structures of the robot 300.

In some embodiments, the limiting mechanism 1053 and the holding mechanism 1052 may be integrally formed. For example, the limiting mechanism 1053 and the holding mechanism 1052 may be injection molded. Alternatively, in other embodiments, the holding mechanism 1052 may be mounted on the limiting mechanism 1053 using suitable fasteners.

In some embodiments, the cross-section of the helix groove 104 on the storage portion 102 in a plane parallel to the feeding direction F is of an arc shape, as shown in FIG. 3. As shown in FIGS. 2 and 3, the diameter of the storage portion 102 may reduce due to the arc cross-section shape of the helix groove 104 on the storage portion 102 and thus the space between the storage portion 102 and the holding section 1052 may be increased. As a result, such embodiments also enable the storage portion 102 to hang a relatively large number of O-rings 200.

In some embodiments, as shown in FIG. 3, a cross-section of the helix groove 104 on the separating portion 103 in a plane parallel to the feeding direction F is of a rectangular or trapezoidal shape. This would facilitate preventing the O-rings 200 from sliding out of the helix groove 104 during the conveying. Furthermore, with the rectangular or trapezoidal cross-section shape of the helix groove 104, the rotatable body 101 may be made more easily. It is to be understood that the above embodiment of the cross-section of the helix groove 104 is merely for illustration, without suggesting any limitations as to the scope of the present disclosure. Any other suitable structures and/or arrangements are possible as well. For example, in some embodiments, the cross-section of the helix groove 104 may be U-shaped, V-shaped or the like.

Furthermore, in some embodiments, the limiting mechanism 1053 may be arranged over a section of the storage portion 102 adjacent to the separating portion 103, as shown in FIG. 3. In this way, the overlapping O-ring 200 may be blocked in the section of the storage portion 102 adjacent to the separating portion 103, which ensures that the O-ring 200 may only be conveyed in the helix groove 104 when in the separating portion 103.

By means of the apparatus 100 and the associated process of separating and feeding the O-ring 200 as described above, the O-rings 200 may be separated and fed to a predetermined position for subsequent process.

Figure 6:
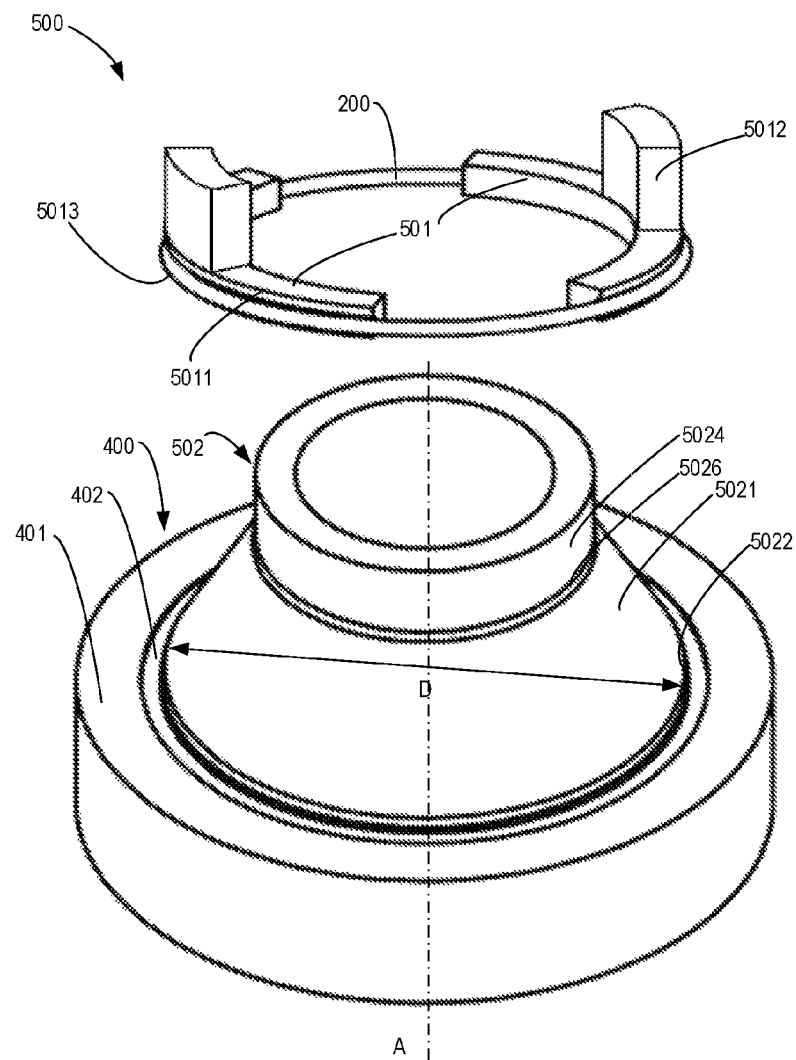
FIG. 6 shows a perspective view of the apparatus for mounting an O-ring to a work piece according to embodiments of the present disclosure, wherein picking components with the O-ring are arranged over the work piece.

In order to automate the mounting of the O-ring 200 such as the flexible O-ring to the work piece 402, an apparatus 500 for mounting the O-ring 200 to the work piece 400 is proposed herein. FIG. 6 shows a perspective view of the apparatus 500 for mounting the O-ring 200 to the work piece 400 according to embodiments of the present disclosure.

Figure 7:
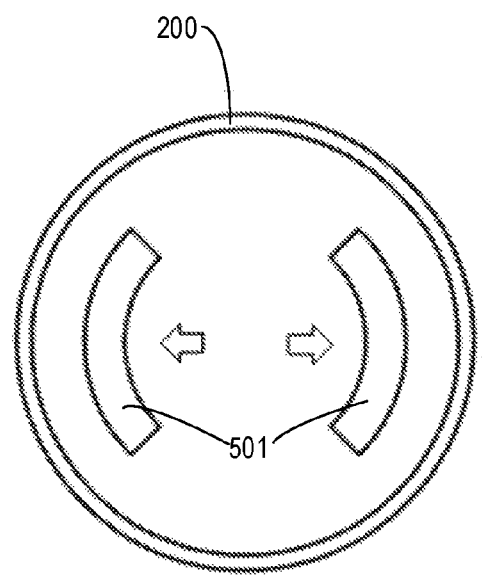
FIG. 7 shows a top view of the apparatus for mounting the O-ring to the work piece according to embodiments of the present disclosure.

In general, as shown in FIG. 6, the apparatus 500 comprises a plurality of picking components 501 and a guiding component 502. The plurality of picking components 501 may be actuated to move away from each other to contact and expand the O-ring 200 located on the predetermined position with their outer circumference, as shown in FIGS. 6 and 7.

In some embodiments, the picking components 501 may be actuated by the robot 300, which will be discussed in detail below. It is to be understood that actuating picking components 501 by the robot 300 is merely for illustration, without suggesting any limitations as to the scope of the present disclosure. Any other suitable structures and/or arrangements to actuate the picking components 501 are possible as well. For example, in some embodiments, the picking components 501 may also be actuated by a servo motor via suitable mechanisms.

Furthermore, the picking components 501 may be moved away from each other in a plane parallel to a plane of the predetermined position where the O-ring 200 is located, so that the O-ring 200 may be picked from the predetermined position. In some embodiments, after picking the O-ring 200, the picking component 501 moves with the O-ring 200 to a position over the work piece 400, as shown in FIG. 6. The picking components 501 may be moved towards each other to release the O-ring 200 onto the guiding component 502.

Figure 8:
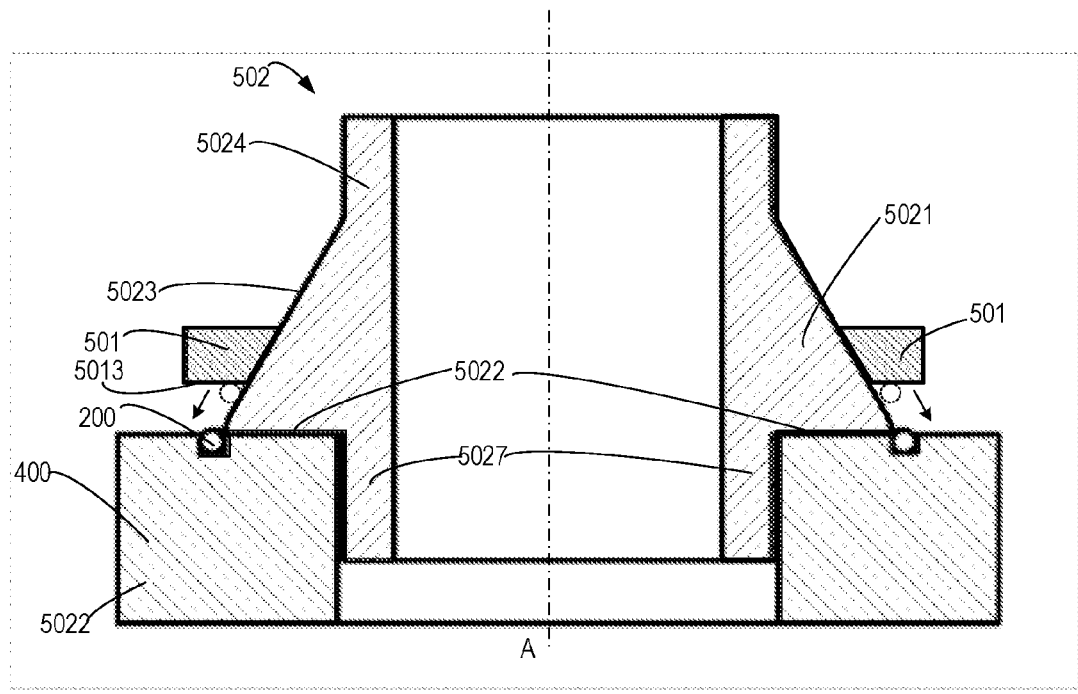
FIG. 8 shows a cross-sectional view of the O-ring being pushed into the groove along a guiding component.

In some embodiments, the guiding component 502 may comprise a frustum portion 5021. The guiding component 502 may be placed on an end surface 401 so that the frustum portion 5021 is coaxial with the groove 402 of the work piece 400 which is for receiving the O-ring 200. As shown in FIG. 6, a large end face 5022 of the frustum portion 5021 is adjacent to the end surface 401. The diameter D of the frustum portion 5021 is substantially the same as an inner diameter of the groove 402. In this way, after the O-ring 200 is released onto a tapered surface of the frustum portion 5021, as shown in FIG. 8, the O-ring 200 may be pushed into the groove 402 along the tapered surface.

As mentioned above, the O-ring 200, particular the flexible O-ring, is easy to be deformed, making it difficult to be positioned. Thus, it is impossible to pick and mount the O-ring 200 with the traditional apparatus. According to the picking components 501 disclosed herein, no matter how deformed the O-ring 200 is, the picking components 501 may pick the O-ring 200 by contacting and expanding the O-ring 200. As a result, it is no need for positioning the O-ring 200, and thus disadvantage effects of deformation of the O-ring 200 are eliminated. In this way, no matter how the O-ring 200 is deformed, the O-ring 200 may be picked and moved to the position over the work piece 400. Furthermore, after the O-ring 200 is released onto the tapered surface of the frustum portion 5021, the tapered surface with a circle cross-section may reshape the deformed O-ring 200 to the original ring-shape. The O-ring 200 is then pushed into the groove 402 along the tapered surface, which ensures that the O-ring may be fitted into the groove 402 even in case that the O-ring 200 is deformed.

Furthermore, with the apparatus 500 the O-ring 200 such as the flexible O-ring may be mounted into the groove 402 of the work piece 400 automatically. As such, the efficiency and accuracy for mounting the O-ring 200 to the work piece 400 are improved. In some embodiments, in order to detect a position of the O-ring 200 on the predetermined position, so that the robot 300 may move the picking components 501 to the position to pick the O-ring 200, a positioning sensor (not shown) may be attached to the robot 300 or the picking components 501, which will be discussed with reference to FIG. 17 below.

In some embodiments, in order to prevent the O-ring 200 from dropping accidentally during the picking process, an arc groove may be provided on the outer circumference of the picking components 501, as shown in FIG. 6. The arc groove may at least partially receive the O-ring 200 circumferentially, thereby preventing the accidental dropping of O-ring 200 during the picking process.

In order to couple the picking components 501 to the robot 300, in some embodiments, each of the picking components 501 may comprise a coupling mechanism 5012 for coupling with the robot 300, as shown in FIG. 6. In some embodiments, the coupling mechanism 5012 may be a structure that may be inserted into the operating mechanism 301. In some other embodiments, the coupling mechanism 5012 may be attached to the operating mechanism 301 via suitable supports. It is to be understood that these example implementations of the coupling mechanism 5012 in FIG. 6 are merely for illustration, without suggesting any limitations as to the scope of the present disclosure. Any other suitable structures and/or arrangements are possible as well.

In some embodiments, as shown in FIG. 8, the O-ring 200 located on the tapered surface of the frustum portion 5021 may be pushed by a surface 5013 of each of the picking components 501. In these embodiments, after releasing the O-ring 200 onto the tapered surface of the frustum portion 5021, the picking components 501 may then move toward the O-ring 200 to contact and push the O-ring 200 into the groove 402. In some embodiments, the picking components 501 may press the O-ring 200 repeatedly while the orientation of the picking components 501 being adjusted to ensure that the O-ring 200 is pressed into the groove 402. As a result, no matter where the O-ring 200 is dropped on the tapered surface of the frustum portion 5021, the O-ring 200 may be reliably mounted in the groove 402 on the work piece 400, without detecting the position and shape.

It can be seen that the O-ring 200 may be picked and pushed into the groove 402 with the picking components 501. It will be appreciated that during the picking and pushing processes, the O-ring 200 is subject to forces applied by the picking components 501. In some embodiments, in order to make the forces evenly distributed on the O-ring 200 during the picking and pushing processes, the picking component 501 may be evenly distributed along the circumference of the O-ring 200 at least during the picking and pushing processes.

In some embodiments, as shown in FIG. 7, the picking components 501 may each have a substantially arc shape. In this way, the arcuate circumference of the picking components 501 may contact the O-ring 200 evenly. In some other embodiments, a number of the picking components 501 may be more than two and a shape of each of the picking components 501 may be any suitable shape, such as cylinder shape or the like. It is to be understood that the above number and the shape of the picking components 501 are merely for illustration, without suggesting any limitations as to the scope of the present disclosure. Any other suitable structures and/or number are possible as well.

Figure 9:
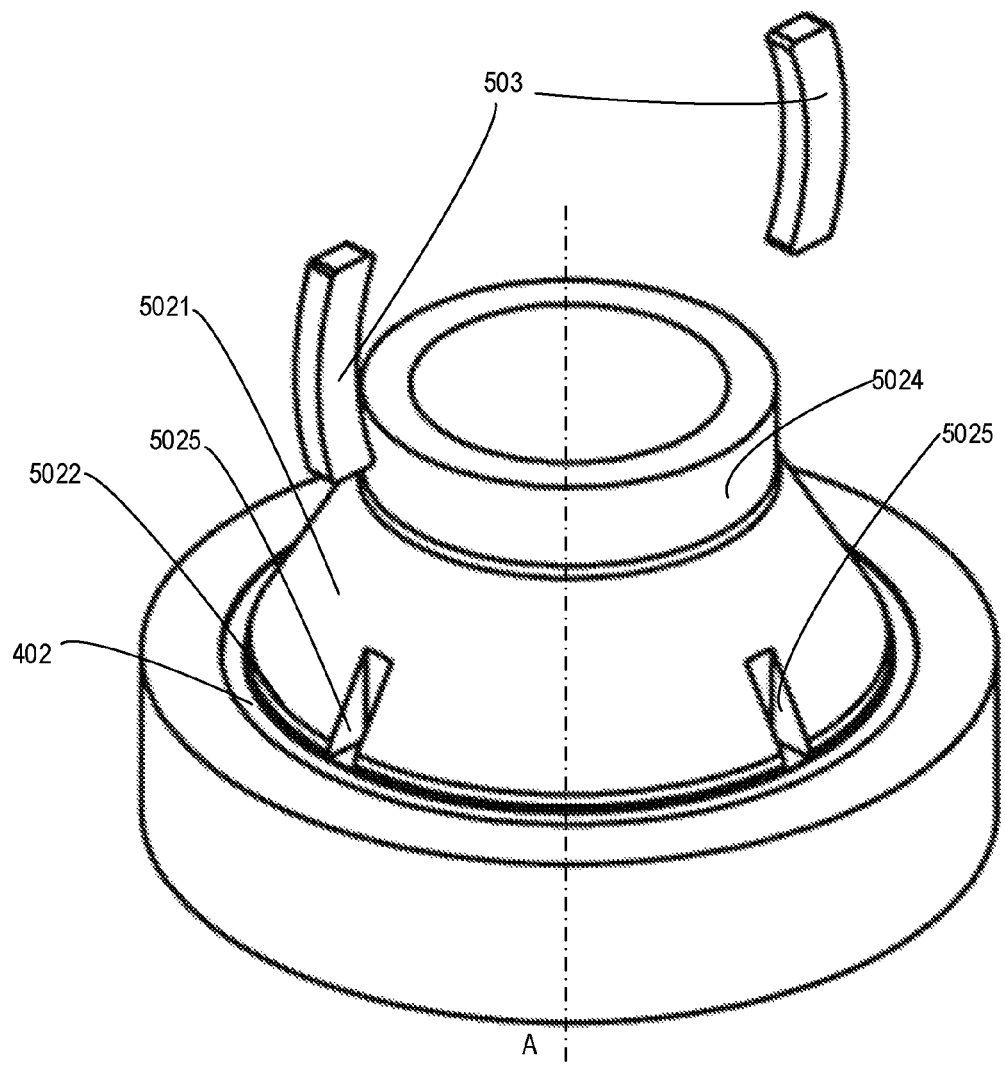
FIG. 9 shows a perspective view of the apparatus for mounting an O-ring to a work piece according to other embodiments of the present disclosure, wherein finger mechanisms are arranged over the work piece.

Alternatively, or in addition, in some embodiments, the apparatus 500 for mounting the O-ring 200 to the work piece 400 may comprise a plurality of finger mechanisms 503, as shown in FIG. 9. Furthermore, the frustum portion 5021 may comprise a plurality of through slots 5025 arranged along the circumference of the large end face 5022. A number of finger mechanisms 503 may be corresponding to the number of the through slots 5025, or smaller that the number of the through slots 5025. In some embodiments, the through slots 5025 may be arranged evenly along the circumference of the large end face 5022, which is more conducive to manufacturing. It is to be understood that the above embodiment of even arrangement of the through slots 5025 is merely for illustration, without suggesting any limitations as to the scope of the present disclosure. Any other suitable structures and/or arrangements are possible as well. For example, alternatively, in some embodiments, the through slots 5025 may be arranged unevenly.

Figure 10A:
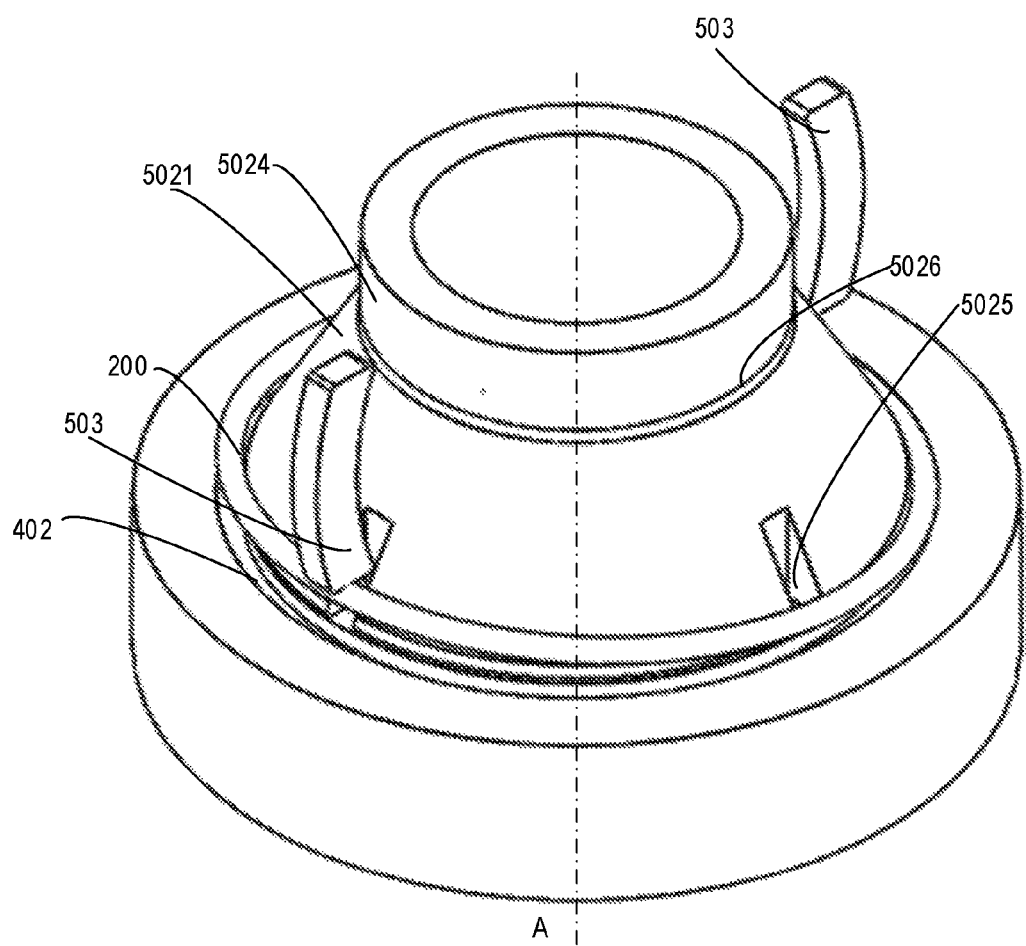
FIGS. 10A-10C show a perspective view of the O-ring being pushed into the groove along a guiding component with the finger mechanisms.
Figure 10B:
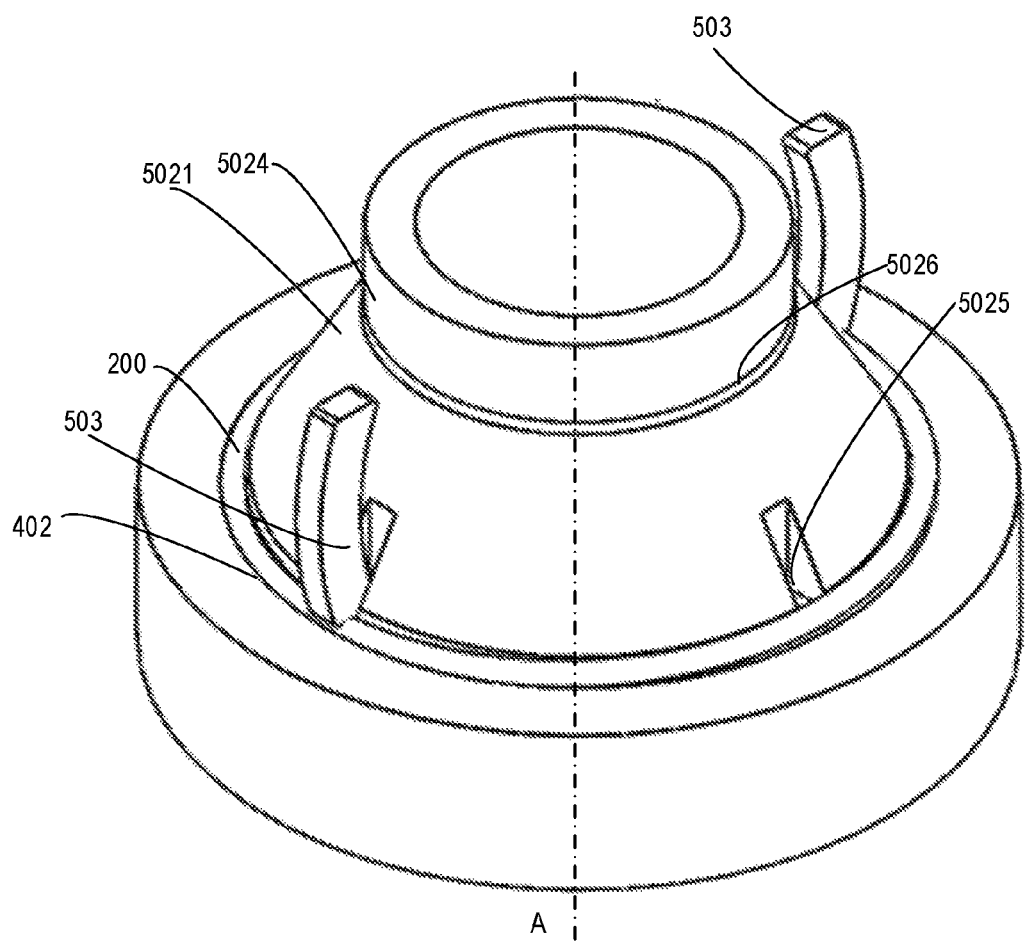

In operation, after the O-ring 200 is released onto the taper surface of the frustum portion 5021, the O-ring 200 may be located across the through slots 5025, as shown in FIG. 10A. The finger mechanisms 503 may be actuated to move along the respective through slots 5025 with their bottom surface contacting the O-ring 200. Due to the small width of each of the through slots 5025, the O-ring 200 cannot be pushed into the through slots 5025 during the above pushing process. In this way, with the movement of the finger mechanisms 503 along the through slots 5025, the O-ring 200 is pushed into the groove 402, as shown in FIG. 10B.

Figure 10C:
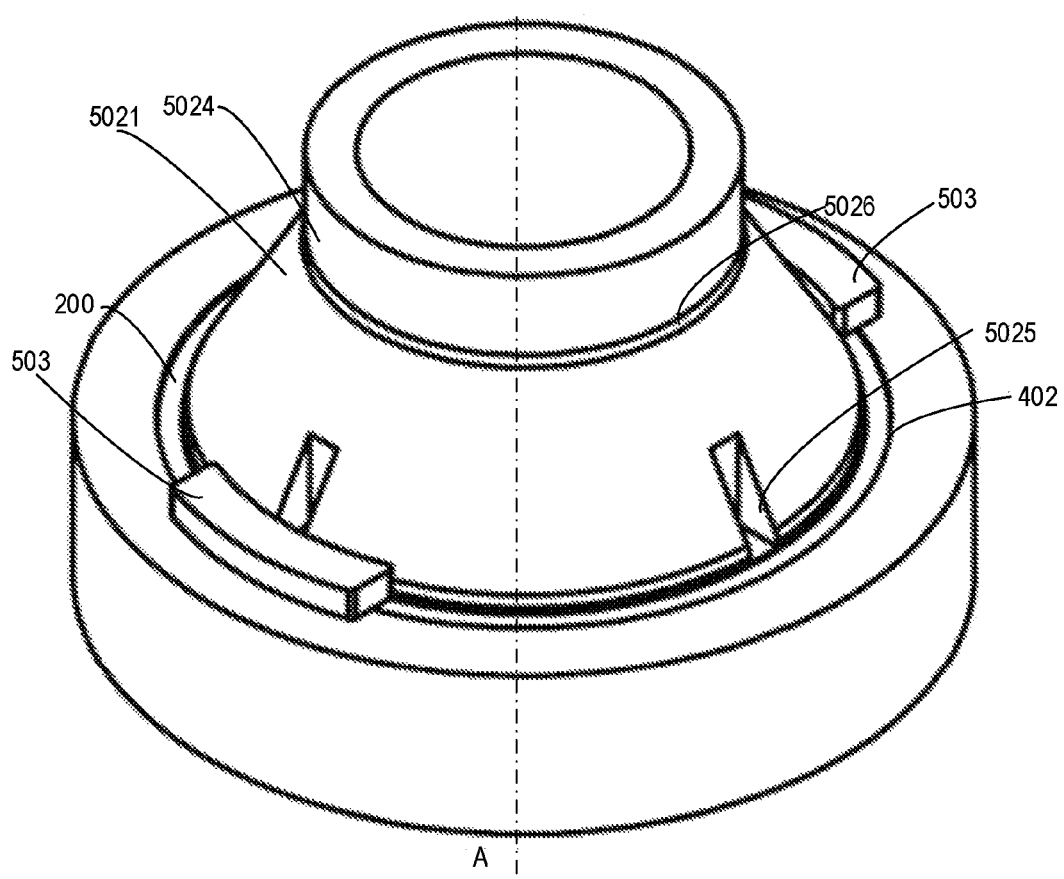

In some embodiments, in order to ensure that the O-ring 200 is pushed into the groove 402, the finger mechanisms 503 may be rotated to adjust their posture, so that the O-ring 200 is further pushed with their side surfaces, as shown in FIG. 10C. It is to be understood that this pushing process by the side surfaces also can be done by the picking components 501. In some embodiments, the picking components 501 and the finger mechanisms 503 may be the same components.

In some embodiments, the finger mechanisms 503 may be coupled to the robot 300, so that they may be controlled and actuated by the robot 300. The finger mechanisms 503 may be coupled to the robot 300 by their own coupling structure or by an extra coupling structure.

Referring back to FIG. 6, in some embodiments, the guiding component 502 may further comprise a coupling portion 5024 for coupling the guiding component 502 to the robot 300. The coupling portion 5024 may be a cylinder extending from a small end face 5026 of the frustum portion 5021 along a central axis A of the guiding component 502, so that the robot 300 may clamp the coupling portion 5024 and arrange it onto the end surface 401 of the work piece 400. It is to be understood that the above embodiment of arranging the guiding component 502 onto the end surface 401 by the robot 300 is merely for illustration, without suggesting any limitations as to the scope of the present disclosure. Any other suitable structures and/or arrangements are possible as well. For example, in some embodiments, the coupling portion 5024 may be omitted, and the guiding component 502 may be arranged onto the end surface 401 through a suitable fixture.

In order to reduce a weight of the guiding component 502, the guiding component 502 may be hollow. As such, the guiding component 502 can be clamped up with low energy consumption. In some embodiments, as shown in FIG. 8, the guiding component 502 may comprise an aligning portion 5027 for aligning the guiding component 502 with the work piece 400. To this end, the aligning portion 5027 may be a portion that extends from a large end face 5022 along the central axis A and may be inserted into an inner hole formed in the work piece 400. In this way, the guiding component 502 is aligned with the work piece 400, with the frustum portion 5021 coaxial with the groove 402.

It is to be understood that the above embodiment of aligning the guiding component 502 with the work piece 400 is merely for illustration, without suggesting any limitations as to the scope of the present disclosure. Any other suitable structures and/or arrangements are possible as well. For example, in some embodiments, the guiding component 502 may be aligned with the work piece 400 by inserting bumps formed on the large end face 5022 of the guiding component 502 into the corresponding slots formed on the end surface 401.

Figure 11:
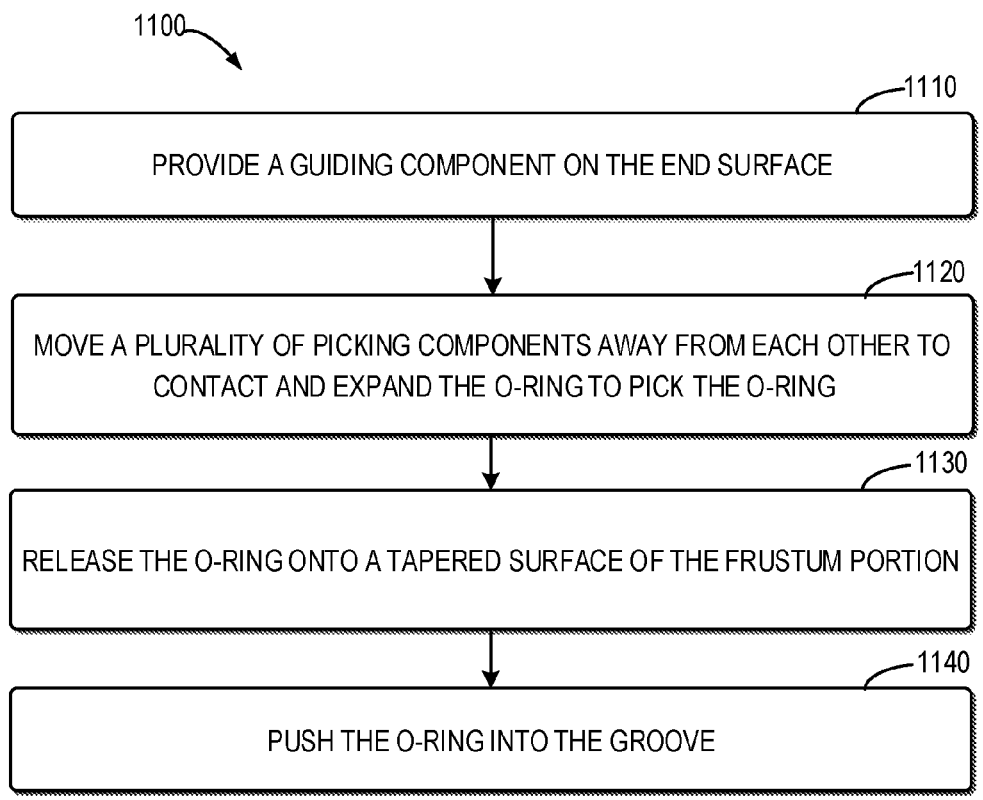
FIG. 11 shows a flowchart of a method for mounting the O-ring on the work piece according to embodiments of the present disclosure.

FIG. 11 shows a flowchart of method for mounting the O-ring 200 on the work piece 400 according to embodiments of the present disclosure. The method 1100 may be implemented by the robot 300 to control the above mentioned apparatus 500 for mounting the O-ring 200 on the work piece 400. As shown, in block 1110, the guiding component 502 may be provided, for example by the robot 300, on the end surface 401.

In block 1120, the plurality of picking components 501 are moved away from each other to contact and expand the O-ring 200 to pick the O-ring 200. Then in block 1130, the O-ring 200 is released onto the taper surface of the frustum portion 5021. In block 1140, the O-ring 200 is pushed into the groove 402.

The foregoing shows the apparatus 500 and method 1100 for mounting the O-rings 200 to the work piece 400 according to embodiments of the present disclosure. As mentioned above, the O-rings 200 at the predetermined position may be expanded and thereby picked by the plurality of picking components 501. The O-ring 200 is then released on the guiding component 502 and pushed into the groove 402. In these embodiments, the O-ring 200 may be mounted in the groove 402 automatically and precisely.

Figure 12:
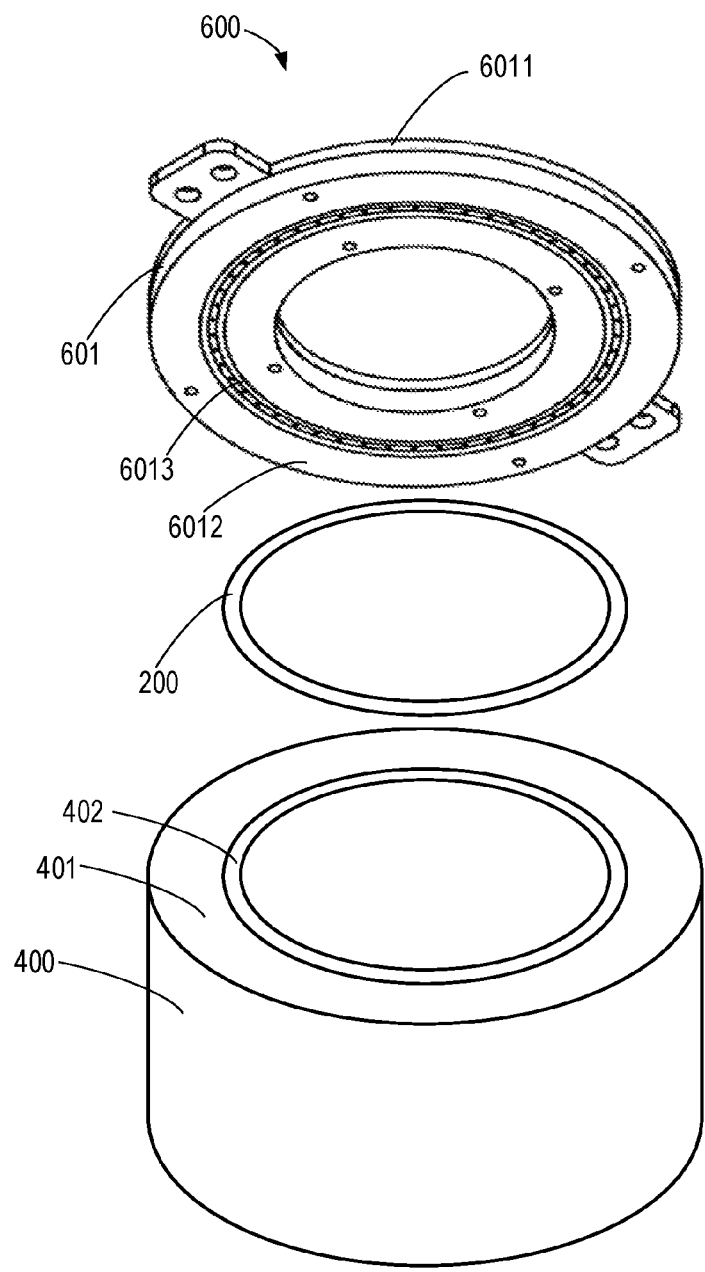
FIG. 12 shows a perspective view of the apparatus for mounting an O-ring to a work piece according to some other embodiments of the present disclosure, wherein the body is arranged over the work piece.

In addition to the apparatus 500 as described above, in some embodiments, another kind of apparatus 600 for mounting the O-ring 200 in the groove 402 of the work piece 400 is proposed. FIG. 12 shows a perspective view of the apparatus 600 for mounting the O-ring 200 to the work piece 400; and FIG. 13 shows a cross-sectional view of the apparatus 600 for mounting the O-ring 200 to the work piece 400 according to some other embodiments of the present disclosure.

Figure 13:
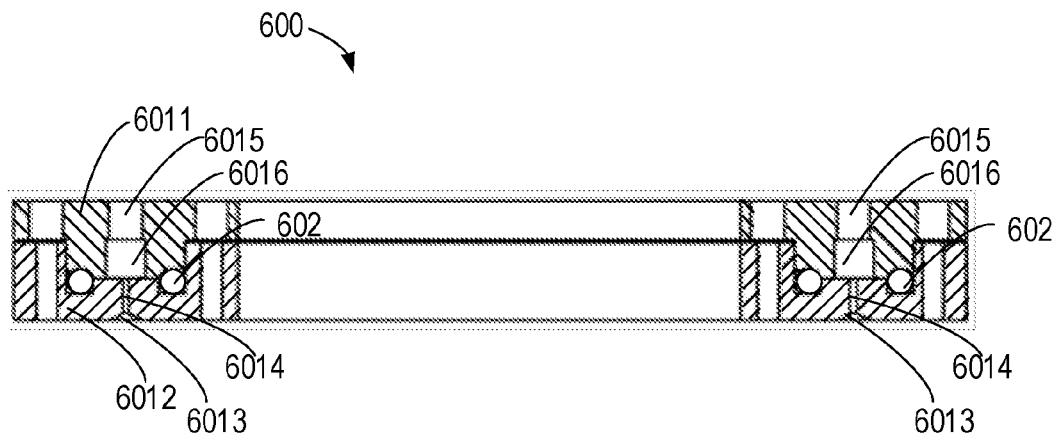
FIG. 13 shows a cross-sectional view of the apparatus for mounting the O-ring to the work piece according to some other embodiments of the present disclosure.
Figure 14:
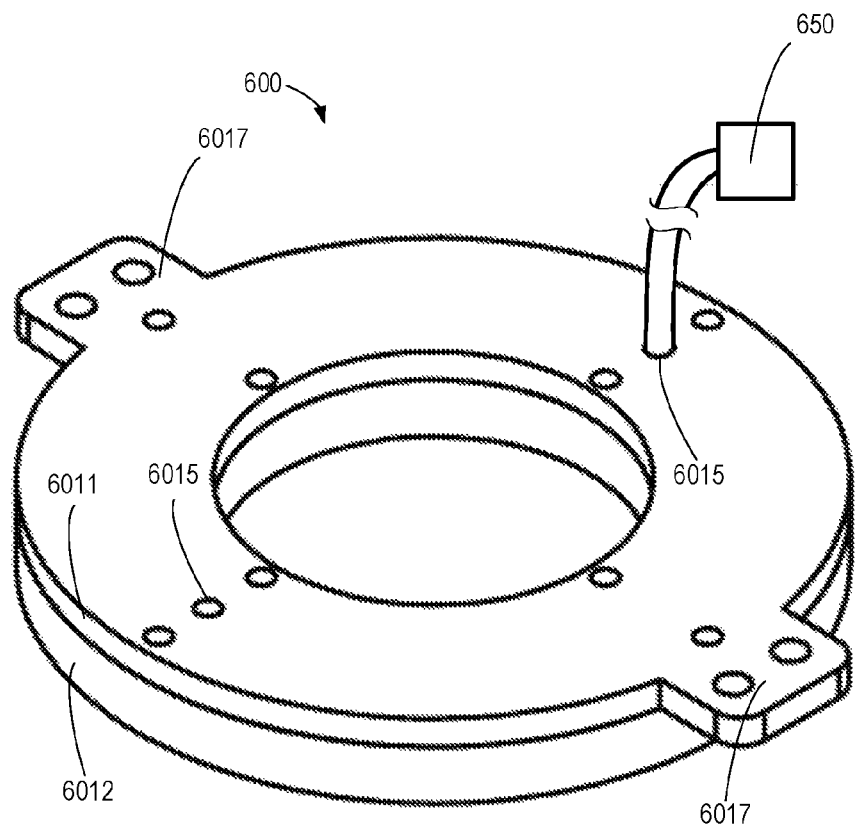
FIG. 14 shows a perspective view of the apparatus for mounting an O-ring to a work piece according to some other embodiments of the present disclosure.

As shown in FIGS. 12 and 13, in general, the apparatus 600 comprises a body 601, an annular groove 6013 formed on the body 601 and a plurality of air channels 6014 formed in the body 601. The body 601 may be connected to a pressure source 650 through a plurality of connecting holes 6015 formed on the body 601, as shown in FIG. 14. The air channels 6014 may be in fluid communication with the annular groove 6013 and the connecting holes 6015. In this way, negative pressure may be provided in the annular groove 6013 with the pressure source 650 to suck the O-ring 200 in the annular groove 6013 when annular groove 6013 is near the O-ring 200.

After the O-ring 200 is sucked in the annular groove 6013, the body 601 is then actuated to move to a position over the work piece 400, so that the annular groove 6013 may be coaxial with the groove 402 on the work piece 400. The pressure source 650 is then disconnected from the body 601, and thus the negative pressure is removed. In this way, the O-ring 200 is dropped into the groove 402. It is to be understood that the disconnecting of the pressure source 650 from the body 601 may be achieve by a valve or the like. Furthermore, in some embodiments, the O-ring 200 may be dropped under its own gravity. Alternatively, in some embodiments, the O-ring 200 also may be dropped into the groove 400 through a guiding surface or the like, for example. It is to be understood that the above embodiments of the O-ring 200 being dropped into the groove 402 are merely for illustration, without suggesting any limitations as to the scope of the present disclosure. Any other suitable methods and/or arrangements are possible as well.

It can be seen that in some embodiments, with the negative pressure formed in the annular groove 6013, the O-ring 200 may be sucked in the annular groove 6013. In these embodiments, the O-ring 200 is picked without deformation. Thus, the O-ring 200 may be dropped in the groove 402 directly. In this way, the O-ring 200 is picked and mounted more efficiently. It is to be understood that the above embodiment of sucking the O-rings 200 in the annular groove 6013 by the pressure source 650 is merely for illustration, without suggesting any limitations as to the scope of the present disclosure. Any other suitable structures and/or arrangements are possible as well.

In some embodiments, instead of disconnecting pressure source 650 from the body 601 to drop the O-ring 200 in the groove 402, the pressure source 650 may provide positive pressure to the air channel 6014 to blow the O-ring 200 out of the groove 402. In this way, when the body 601 with the O-ring 200 is moved over the work piece 400, the positive pressure provided by the pressure source 650 may form air flow blowing from the air channel 6014 towards the O-ring 200. Consequently, the O-ring 200 may be dropped in the groove 402 of the work piece 400 with the air flow. Furthermore, because the air flow from the air channel 6014 may push the O-ring towards the groove 402, the blowing air flow may facilitate the mounting of the O-ring 200.

The pressure source 650 for providing the positive pressure and the negative pressure may be a same pressure source 650 or two separated pressure sources. In the case of the pressure source being two separated pressure sources, the separated pressure sources may be connected to the different connecting holes 6015 respectively. As a result, when the body 601 with the O-ring 200 is moved over the work piece 400, the pressure source providing the negative pressure may be disconnected from the body 101 and the pressure source providing the positive pressure may then provide the positive to the air channel 6013.

In some embodiments, the body 601 may comprise at least one mounting portion 6017 formed on the body 601 for coupling the body 601 to the robot 300, as shown in FIG. 14. In this way, the apparatus 600 may be manipulated by the robot 300 automatically. It is to be understood that the mounting portions 6017 as shown in FIG. 14 are merely for illustration, without suggesting any limitations as to the scope of the present disclosure. Any other suitable structures and/or number are possible as well. For example, in some embodiments, the mounting portions 6017 may be structures that may be inserted into the operating mechanism 301. In some other embodiments, the mounting portions 6017 may be attached to the operating mechanism 301 via suitable supports.

In some embodiments, a radial cross-section of the annular groove 6013 may be of arc shape, as shown in FIG. 15. In these embodiments, a radius of the radial cross-section of the O-ring 200 may be substantially the same as the wire diameter or the O-ring 200, and thus the O-ring 200 may fit an inner surface of the annular groove 6013, as shown in FIG. 15. As a result, the negative pressure formed in the air channel 6014 and the annular groove 6013 is not easy to leak and thus the O-ring 200 may be held in the annular groove 6013 more steadily. In this way, it is possible to improve stability when the O-ring 200 is sucked in the annular groove 6013.

As shown in FIG. 15, in some embodiments, at least one edge of the annular groove 6013 may be chamfered. For example, one or both of the edges of the annular groove 6013 may be rounded, so that the annular groove 6013 may have a larger opening for receiving the O-ring 200. The radius of the rounded chamfer of the edge of the annular groove 6013 is well designed to avoid affecting the suction of the O-ring 200 in the annular groove 6013. Such an arrangement facilitates sucking the O-ring in the annular groove 6013.

In some embodiments, the body 601 may be manipulated to move back and forth in multiple directions while being moved towards or away from the O-ring 200, as shown in FIGS. 16A and 16B. FIG. 16A shows a top view of the body 601 and FIG. 16B shows a side view of the body 601. As a result, with the above movements of the body 601, sections of the O-ring 200 that are not sucked in the annual groove 6013 due to the deformation may be contacted and pushed by a surface of the body 601 formed with the annular groove 6013. In this way, it is ensured that the O-ring 200 may be sucked in the annular groove 6013 even when the O-ring 200 is deformed.

It can be seen that in some embodiments, with the multi-direction and up-and-down movements of the body 601, even the O-ring 200 is slightly deformed, it may be sucked in the annular groove 6013. Furthermore, the ring shape of the annular groove 6013 and the sucking force formed therein are helpful to reshape the deformed O-ring 200, which facilitates the mounting of the O-ring 200.

In some embodiments, after dropping the O-ring 200 in the groove 402, the body 601 may be actuated to move back and forth in multiple directions while being moved towards or away from the O-ring 200. In this way, it is ensured that the O-ring 200 is mounted in the groove 402 on the work piece 400.

In some embodiments, the body 601 may adopt a split structure for ease of manufacture. For example, as shown in FIG. 13, the body 601 may comprise two portions (for ease of discussion, refer to as "a first portion 6011" and "a second portion 6012" respectively) and at least one sealing component 602 arranged between the first portion 6011 and the second portion 6012. In these embodiments, the annular groove 6013 and the air channels 6014 may be formed in the second portion 6012 and the connecting holes 6015 may be formed in the first portion 6011.

The first portion 6011 and the second portion 6012 may be secured by any suitable mechanisms including, but not limited to, screws, bolts and nuts, welding or the like, for example. The sealing components 602, such as O-rings, may be arranged between the first portion 6011 and the second portion 6012 to prevent the vacuum in the annular groove 6013 and the air channels 6014 from leaking. It is to be understood that the above embodiment of the structure of the body 601 is merely for illustration, without suggesting any limitations as to the scope of the present disclosure. Any other suitable structures and/or arrangements are possible as well. For example, the body 601 may be formed by three-dimensional (3D) printing.

In some embodiments, the body 601 may further comprise a vacuum chamber 6016 for connecting the air channels 6014 and the connecting holes 6015. The vacuum chamber 6016 may be formed in the first portion 6011 and ring-shaped coaxially with the annular groove 6013. With the vacuum chamber 6016 between the air channels 6014 and the connecting holes 6015, the numbers of the air channels 6014 and the connecting holes 6015 may be set separately. For example, the number of the connecting holes 6015 may be set to one or two to simplify the connecting structure with the pressure source 650. In the same time, the air channels 6014 may be more than ten and arranged evenly and circumferentially to make the negative pressure formed in the annular groove 6013 more uniform.

Furthermore, the vacuum chamber 6016 may provide a buffer for the vacuum formed in the air channels 6014 and the annular groove 6013, thus preventing the O-ring 200 from accidentally falling due to a sudden interruption of the vacuum. It is to be understood that the above embodiment of the vacuum chamber 602 is merely for illustration, without suggesting any limitations as to the scope of the present disclosure. Any other suitable structures and/or arrangements are possible as well. For example, the vacuum chamber 602 may adopt a segmented structure, which makes the body 601 more robust.

Figure 17:
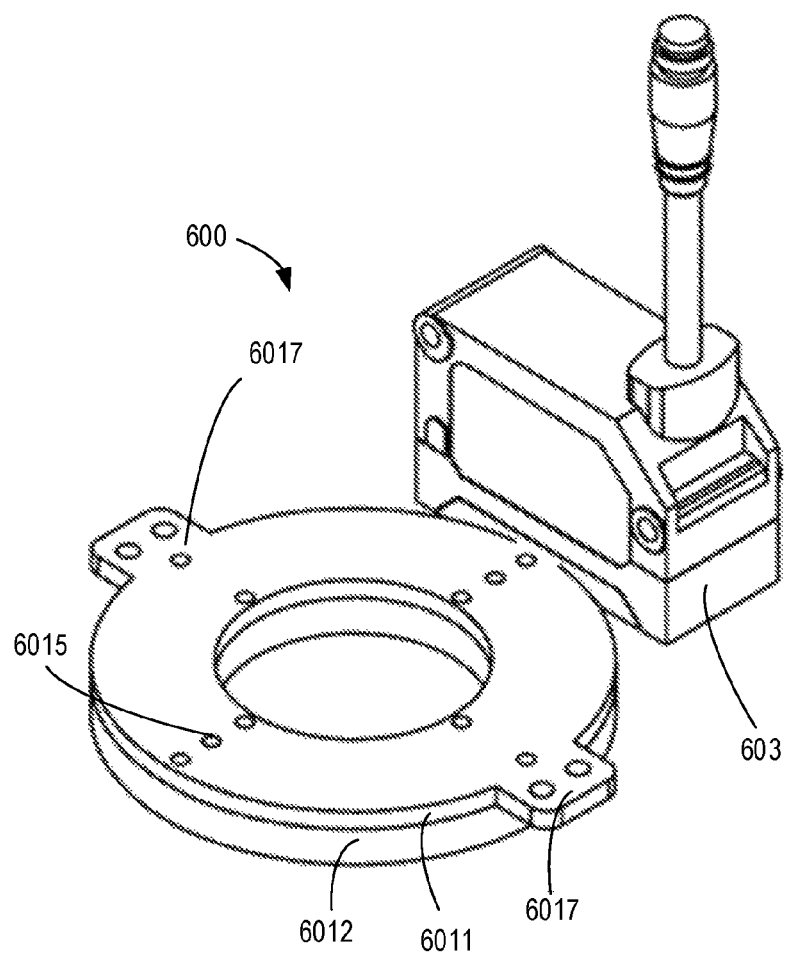
FIG. 17 shows a perspective view of the apparatus with a positioning sensor for mounting an O-ring to a work piece according to some other embodiments of the present disclosure.

As mentioned above, the O-ring 200 may be sucked into the annular groove 6013 when the annular groove 6013 is near the O-ring 200. In order to detect a position of the O-ring 200 on the predetermined position, so that the robot 300 may move the body 601 to the position near the O-ring 200, a positioning sensor 603 may be attached to the body 601, as shown in FIG. 17. Only by way of example, the positioning sensor 603 will be discussed in detail to introduce the use of a positioning sensor herein. It is to be understood that the positioning sensor may be used in any suitable scenarios or components as mentioned herein. For example, the positioning sensor may be attached to the picking components 501, the robot 300 or the like. Specifically, the positioning sensor 603 may be a laser sensor which detects the position of the O-ring 200 by sensing the distance difference. In some embodiments, the positioning sensor 603 may be a camera. In these embodiments, a processing unit, such as the robot 300, may process images captured by the camera to detect the position of the O-ring 200.

Furthermore, the positioning sensor 603 may also detect a position of the groove 402 on the work piece 400, so that the body 601 may be moved to a position aligned with the position to mount the O-ring 200. In some embodiments, the positioning sensor 603 may be mounted to the robot 300 or any other suitable structures. It is to be understood that the above embodiment of the positioning sensor 603 is merely for illustration, without suggesting any limitations as to the scope of the present disclosure. Any other suitable structures and/or arrangements are possible as well.

Figure 18:
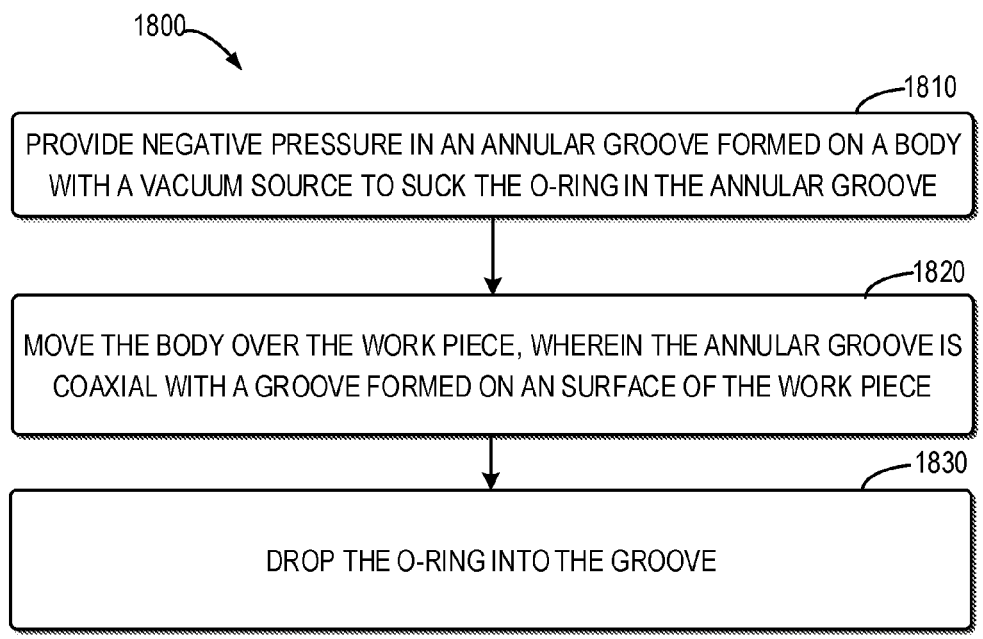
FIG. 18 shows a flowchart of a method for mounting the O-ring on the work piece according to some other embodiments of the present disclosure.

FIG. 18 shows a flowchart of method for mounting the O-ring 200 on the work piece 400 according to some other embodiments of the present disclosure. The method 1800 may be implemented by the robot 300 to control the above mentioned apparatus 600 for mounting the O-ring 200 on the work piece 400. As shown, in block 1810, the O-ring 200 may be sucked in the annular groove 6013 by the negative pressure formed therein.

In block 1820, the body 601 may be moved over the work piece, with the annular groove 6013 being coaxial with the groove 402 of the work piece 400. Then in block 1830, the O-ring 200 is dropped into the groove 402 by disconnecting the pressure source 650 from the body 601 or providing positive pressure to the plurality of air channels 6014 using the pressure source. In this way, the O-ring 200 is sucked by the apparatus 600 and dropped in the groove 402.

In some embodiments, before the body 601 is moved over the work piece 400, the body 601 may be moved back and forth in multiple directions while being moved towards and away from the O-ring 200. In this way, it is may be ensured that the O-ring 200 may be sucked in the annular groove 6013.

In some embodiments, after the O-ring 200 is dropped into the groove 402, the body may be moved back and forth in multiple directions while being moved towards and away from the O-ring 200. This step may ensure the O-ring 200 to be in the groove 402.

As can be seen from the above embodiments of the present disclosure, the plurality of O-rings 200, particularly the flexible O-rings may be separated, fed and mounted to the work piece 400 automatically. This overall improves the accuracy and efficiency of the assembly of the work piece 400 involves the separating, feeding and mounting of the O-rings 200.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. An apparatus for mounting an 0-ring to a work piece, comprising:
   a body comprising a plurality of connecting holes for connecting a pressure source to the body;
   an annular groove formed on the body and adapted to receive the O-ring; and
   a plurality of air channels formed in the body, the plurality of air channels being in fluid communication with the annular groove and the plurality of connecting holes to provide negative pressure with the pressure source in the annular groove to suck the O-ring in the annular groove,
   wherein the annular groove is coaxial with a groove formed on a surface of the work piece during the mounting so that the 0-ring is dropped into the groove when the pressure source is disconnected from the body or provides positive pressure to the plurality of air channels.

2. The apparatus of claim 1, wherein a radial cross-section of the annular groove is of an arc shape, a radius of the arc being substantially the same as a wire diameter of the O-ring.

3. The apparatus of claim 2, wherein at least one edge of the annular groove has chamfers.

4. The apparatus of claim 1, wherein the body comprises a first portion, a second portion and at least one sealing component arranged between the first portion and the second portion, and
   wherein the annular groove and the plurality of air channels are formed in the second portion, and the plurality of connecting holes are formed in the first portion.

5. The apparatus of claim 4, further comprising a vacuum chamber formed on the first portion for connecting the plurality of air channels and the plurality of connecting holes.

6. The apparatus of claim 5, wherein the vacuum chamber is ring-shaped and coaxial with the annular groove.

7. The apparatus of claim 6, wherein the plurality of air channels are arranged evenly and circumferentially between the annular groove and the vacuum chamber.

8. The apparatus of claim 1, further comprising at least one mounting portion arranged on the body and adapted to couple the body to a robot.

9. The apparatus of claim 1, further comprising a positing positioning sensor mounted on the body and adapted to detect a position of the 0-ring or the groove.

10. A method for mounting an 0-ring to a work piece, comprising:
    providing negative pressure in an annular groove formed on a body with a pressure source to suck the O-ring in the annular groove, wherein a plurality of connecting holes are formed on the body for connecting the pressure source to the body, and wherein a plurality of air channels are in fluid communication with the annular groove and the plurality of connecting holes;
    moving the body over the work piece, wherein the annular groove is coaxial with a groove formed on a surface of the work piece; and
    dropping the O-ring into the groove by disconnecting the pressure source from the body or providing positive pressure to the plurality of air channels using the pressure source.

11. The method of claim 10, further comprising:
    moving the body, before moving the body over the work piece, back and forth in multiple directions while moving the body towards and away from the O-ring to ensure the O-ring to be sucked in the annular groove.

12. The method of claim 10, further comprising:
    moving the body, after dropping the O-ring into the groove, back and forth in multiple directions while moving the body towards and away from the O-ring to ensure the O-ring to be in the groove.

13. A system, comprising:
    a robot;
    a pressure source; and an apparatus operatively coupled with said robot for mounting an O-ring to a work piece, the apparatus comprising:
- a body comprising a plurality of connecting holes for connecting the pressure source to the body;
- an annular groove formed on the body and adapted to receive the O-ring; and
- a plurality of air channels formed in the body, the plurality of air channels being in fluid communication with the annular groove and the plurality of connecting holes to provide negative pressure with the pressure source in the annular groove to suck the 0-ring in the annular groove,
- wherein the annular groove is coaxial with a groove formed on a surface of the work piece during the mounting so that the O-ring is dropped into the groove when the pressure source is disconnected from the body or provides positive pressure to the plurality of air channels.

14. The system of claim 13, wherein a radial cross-section of the annular groove is an arc shape, a radius of the arc being substantially same as a wire diameter of the O-ring.

15. The system of claim 14, wherein at least one edge of the annular groove has chamfers.

16. The system of claim 13, wherein the body comprises a first portion, a second portion and at least one sealing component arranged between the first portion and the second portion, and wherein the annular groove and the plurality of air channels are formed in the second portion, and the plurality of connecting holes are formed in the first portion.

17. The system of claim 16, further comprising a vacuum chamber formed on the first portion for connecting the plurality of air channels and the plurality of connecting holes.

18. The system of claim 17, wherein the vacuum chamber is ring-shaped and coaxial with the annular groove.

19. The system of claim 18, wherein the plurality of air channels are arranged evenly and circumferentially between the annular groove and the vacuum chamber.

20. The system of claim 13 further comprising at least one mounting portion arranged on the body and adapted to couple the body to a robot.

* * * * *